Patented May 3, 1932

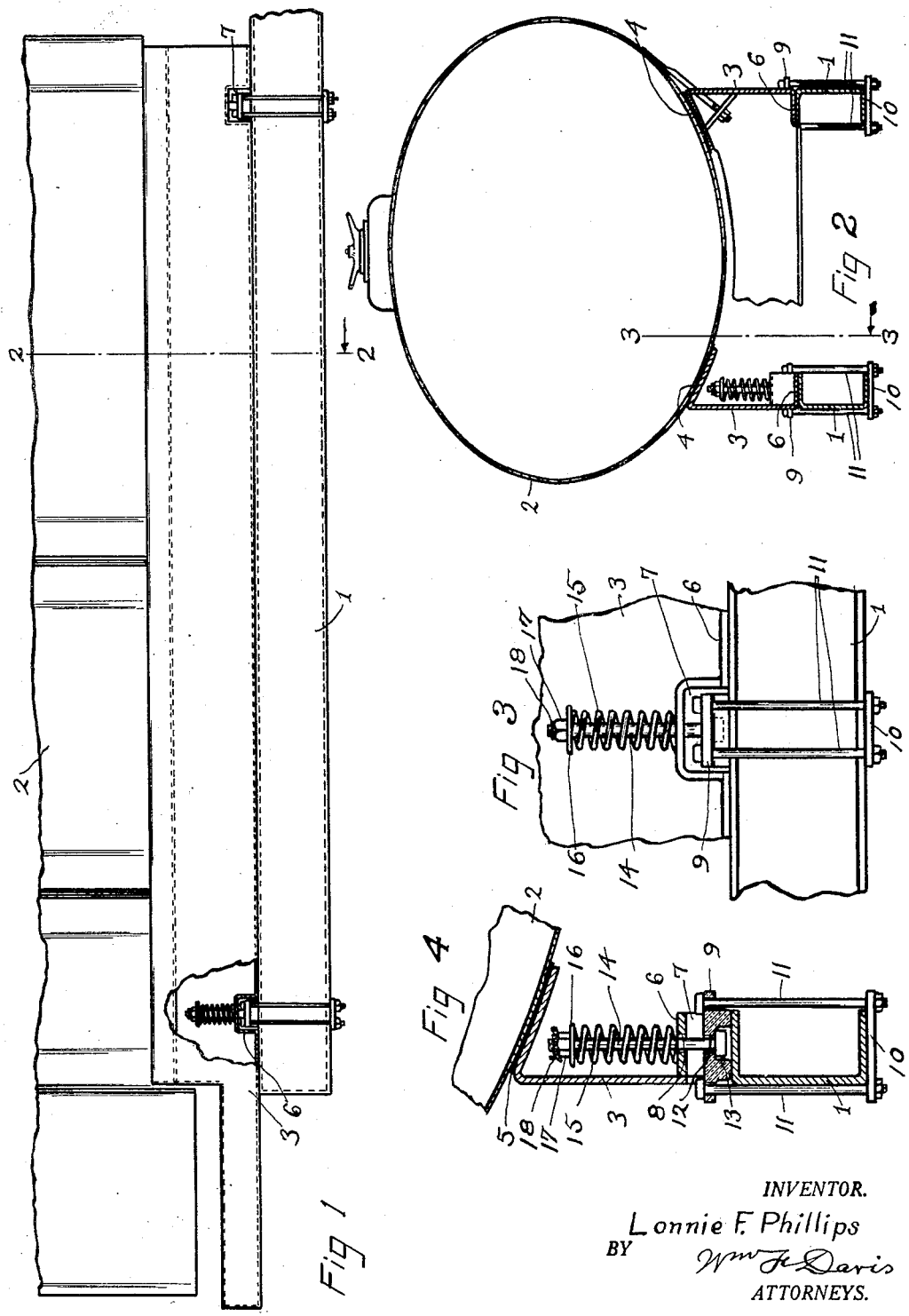

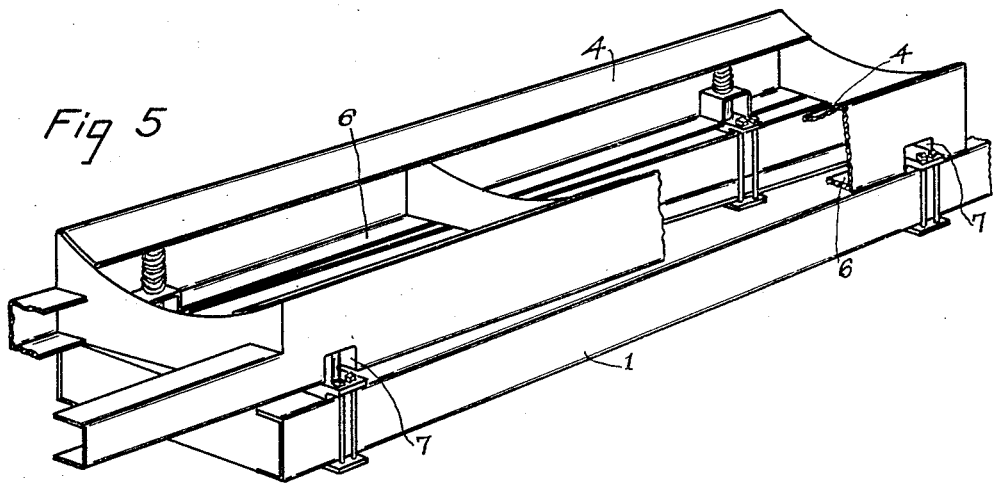
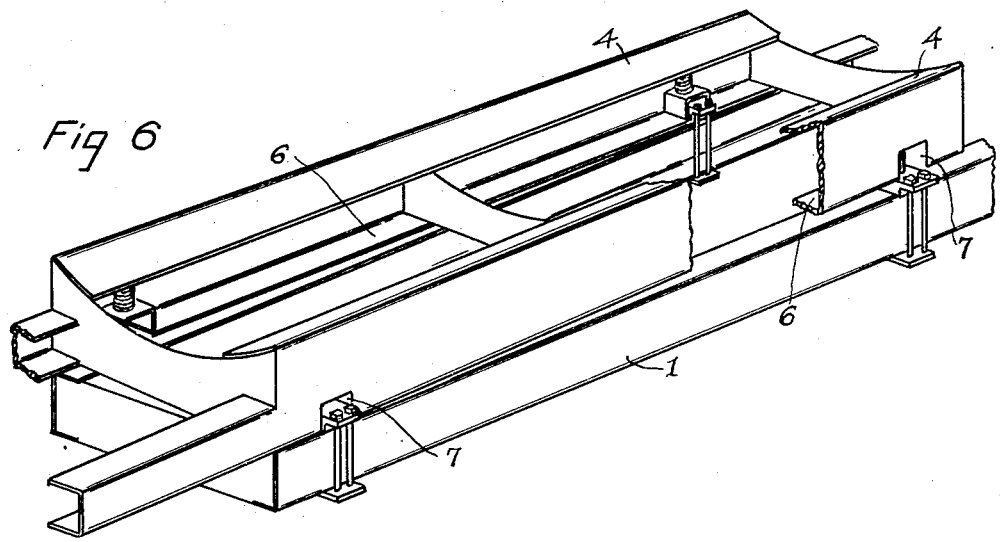

1,856,399

UNITED STATES PATENT OFFICE

LONNIE F. PHILLIPS, OF TOWNSHIP FIFTY-ONE, CLAY COUNTY, MISSOURI

TRUCK TANK MOUNTING

Application filed January 27, 1930. Serial No. 423,651.

The invention relates to torsion eliminating mounting for truck tanks and has provided an improved mounting for truck tanks that eliminates the usual torsional stress from truck tanks that is due to uneven roads, streets and highways, and prevents racking, loosening and breaking of the seams and sheets of the tank, that result from the usual mounting of tanks on trucks.

The usual tank truck is an auxiliary to the railway tank lines and has become very important in the movement, transportation and delivery of petroleum products as well as many other commodities, and it is commonly known that the usual method of mounting the tank on the truck causes the tank to be subject to torsional stresses that work the seams loose and break the sheets or walls of the tank which causes leakage of the contents of the tank.

It is well known that any leakage of a tank transporting petroleum products is not only expensive from loss of the commodity and repairs of the tank, but there is always a considerable danger, as petroleum products are very inflammable. Destructive fires have resulted from leaking truck tanks.

The present invention has provided a simple and efficient method of mounting tanks on trucks so that the torsional stresses usually caused by the truck are removed, thereby eliminating expensive repairs of the tank, loss of the commodity, and a great element of danger from fires.

With these and other objects in view, the invention consists in the features of construction, combinations and arrangements of parts as hereinafter set forth and more particularly pointed out in the appended claim, the accompanying drawings illustrating a form of the improved tank mounting that has been manufactured and marketed extensively during the past few months with perfect satisfaction to the manufacturer and user.

In the drawings:

Fig. 1 is a broken view in side elevation of a truck frame and a fragmentary view of a tank mounted thereon, illustrating the improved torsion eliminating tank mounting.

Fig. 2 is a sectional view taken on line 2—2 of Fig. 1 with the section of the tank in full view.

Fig. 3 is an enlarged fragmentary view taken on line 3—3 of Fig. 2.

Fig. 4 is an enlarged fragmentary view of Fig. 2 more clearly illustrating details that are too small to be shown on the same scale as Fig. 2.

Figs. 5 and 6 are broken perspective views of the truck frame and the tank frame shown in Fig. 1, to more fully illustrate the action of the frames in operation.

The truck frame 1 is of common and well known construction and is merely shown to illustrate the connection of the improved truck tank mounting to the truck, the wheels and accompanying parts that carry the truck frame being of common construction and well understood, so that their illustration is not deemed necessary to the present invention.

The tank 2 is of usual construction and it is not desired to claim any particular construction of tank, as the improved truck tank mounting can be employed in connection with any of the well known tanks now in use for delivering and transporting petroleum products and the like.

The upper portion of the tank frame 3 is provided with the internally disposed flanges 4 along each side thereof, the flanges being shaped to the tank 2 and preferably welded rigidly thereto as shown particularly at 5 Fig. 4. It will be understood from the foregoing that the tank frame is always rigid with the tank.

The lower portion of the tank frame 3 is provided with the internally disposed flanges 6, and the downwardly opening recesses 7, the flanges 6 conforming to the shape of the recesses, the lower face of the tank frame 3 lying in a common plane except for the notches or recesses 7.

Through the flanges 6 over each recess 7 is the hole 8 and resting on the truck frame 1 within each recess 7 is the downwardly bearing tie block 9, while below each downwardly bearing tie block and below the truck frame is the upwardly bearing tie plate 10, the tie blocks and the tie plates being rigidly bolted to the truck frame by the bolts 11 which pass through the blocks and through the plates.

The tie blocks 9 are provided with the holes 12 counterbored at 13, and passing upwardly through the holes 12 in the tie blocks and the holes 8 in the flanges 6 are the bolts 14, each of the bolts 14 being surrounded by the coiled compression spring 15 which is held in compression by the washer 16 and the nut 17 and safety locked by the cotter pin 18.

It will be understood from the foregoing description that the tank 2 is rigid with the tank frame 3, and that the tank frame 3 rests upon the truck frame 1 and is held thereagainst by the springs 15, so that except when torsional force is applied to the truck frame, the tank frame bears evenly on the truck frame.

When the truck frame 1 becomes twisted by torsional stress caused by uneven roads and the like, the springs 15 allow the truck frame to recede away from the tank frame at diagonal corners as illustrated by Figs. 5 and 6, relieving the tank 2 of torsional stress that would cause the tank to crack, break and leak.

The elimination of cracking, and breaking of the tank results in a considerable saving in repairs to the tank, retains the commodity without leakage and removes an always present danger of fire.

Having described my invention, what I claim as new and desire to secure by Letters Patent, is:—

In a torsion eliminating truck tank mounting, a tank, a tank frame rigid with and supporting said tank, a truck frame, downwardly bearing tie blocks above and disposed transversely of said truck frame, upwardly bearing tie plates below and disposed transversely of said truck frame, bolts passing through said tie blocks and said tie plates and rigidly binding all of said blocks and said plates to said truck frame, a spring retaining bolt passing upwardly through each of said tie blocks and through said tank frame, each spring retaining bolt held downwardly by the companion tie block, a spring surrounding each of said spring retaining bolts, and means on each of said spring retaining bolts to retain the corresponding spring in tension downwardly on said tank frame so that either corner and diagonal corners of said frames can separate and prevent the torsional movements of said truck frame from bending and breaking said tank.

LONNIE F. PHILLIPS.